United States Patent [19]
Hercamp et al.

[11] Patent Number: 6,001,503
[45] Date of Patent: Dec. 14, 1999

[54] BATTERY SEPARATOR HAVING A PUNCTURE-PROOF BORDER

[75] Inventors: Dennis Wayne Hercamp, Pendleton; Tony Edward Key, Yorktown, both of Ind.

[73] Assignee: General Motors Corporation, Detroit, Mich.

[21] Appl. No.: 08/918,812

[22] Filed: Aug. 26, 1997

[51] Int. Cl.[6] .............................. H01M 2/18; H01M 2/16
[52] U.S. Cl. ..................... 429/139; 429/136; 429/143; 429/254
[58] Field of Search ................... 429/254, 139, 429/136, 143

[56] References Cited

U.S. PATENT DOCUMENTS

| | | | |
|---|---|---|---|
| 3,853,626 | 12/1974 | Daniels, Jr. et al. | |
| 4,368,243 | 1/1983 | O'Rell et al. | 429/254 X |
| 5,558,952 | 9/1996 | Knauer | 429/254 X |
| 5,607,484 | 3/1997 | Redden et al. | 429/139 X |

FOREIGN PATENT DOCUMENTS

| | | |
|---|---|---|
| 0 062 525 | 10/1982 | European Pat. Off. |
| 0 484 295 | 5/1992 | European Pat. Off. |
| 57-009058 | 1/1982 | Japan . |
| 61-2263 | 1/1986 | Japan ................... 429/254 |
| 2-160365 | 6/1990 | Japan . |

*Primary Examiner*—John S. Maples
*Attorney, Agent, or Firm*—Margaret A. Dobrowitsky

[57] ABSTRACT

A microporous polymer battery separator having a puncture-proof corrugated border along the lateral edges thereof.

5 Claims, 4 Drawing Sheets ously, such separators will vary in thickness from about 0.006 in. to about 0.015 in. in the backweb section of the separator that lies between spacer ribs on the face of the separator.

BATTERY SEPARATOR HAVING A PUNCTURE-PROOF BORDER

TECHNICAL FIELD

This invention relates to interelectrode separators for electric storage batteries, and more particularly to battery separators having rib-reinforced borders to prevent puncture thereof by the battery electrode's gridwires.

BACKGROUND OF THE INVENTION

Electric storage batteries typically comprise an electrochemically active cell element comprising a plurality of interleaved positive and negative polarity electrode plates separated one from the other by thin, ribbed, microporous polymer (e.g., polyethylene, PVC, etc.) sheets interjacent adjacent plates. The separators serve to separate and electrically isolate one (e.g., positive electrode) from the other (e.g., negative counterelectrode), have sufficiently small pores therein to suppress interplate dendrite growth, and sufficiently high porosity as to permit electrolyte and ionic mobility within the cell. A commercially popular such separator comprises microporous polyethylene which is marketed under the tradenames DARAMIC® by the W. R. Grace Co. or RHINOHIDE® by the Emark Co. Typically, such separators will vary in thickness from about 0.006 in. to about 0.015 in. in the backweb section of the separator that lies between spacer ribs on the face of the separator. Some manufacturers envelop the plates of one or both polarities in individual sheaths or envelopes formed from sheets of the separator material. Enveloping the plates in separator sheaths reduces the possibility of interplate shorting occurring at the edges of adjacent positive and negative plates. A typical such sheath is formed by folding an elongated strip of separator material in half, transverse its length, and inserting the plate into the fold (see FIG. 1). Thereafter, the lateral edges of the sheath outboard the edges of the inserted plate are bonded together as by heat sealing, electrosonic welding, pressure welding or the like.

The electrode plates themselves typically comprise a conductive metal grid (e.g., lead) embedded in a mass of electrochemically active material (e.g., Pb or $PbO_2$). One such grid comprises an expanded metal grid such as disclosed in U.S. Pat. No. 3,853,626 issued Dec. 10, 1974 and assigned to the assignee of the present invention. When pasted with active material and cut into plates, such expanded metal grids frequently have sharp gridwire ends along the lateral edges of the plate which can puncture the borders of the separator envelope which, in turn, can cause internal shorting within the battery and a significant reduction in its useful life.

SUMMARY OF THE INVENTION

The present invention is directed to a microporous polymer battery separator, and plate envelope/sheath made therefrom, designed and configured to reduce the likelihood of the gridwire end puncturing the separator along the lateral borders thereof. More specifically, the present invention contemplates a microporous polymer separator, and sheathed electrode plate made therefrom, wherein the separator has a pair of borders along the lateral edges thereof which comprise a plurality of closely spaced ribs each separated from the next by a concave furrow forming an elongated fillet at the bases of adjacent ribs. The rib frequency/density is such as to provide at least 29 ribs per lineal inch, and preferably about 34 ribs per lineal inch. In a preferred embodiment, the exterior surface of the border is corrugated. Most preferably, the surface of the border is characterized by a plurality of straight, parallel, regularly spaced and equally curved ribs and concave furrows intermediate the ribs. The closely spaced ribs and concave furrows therebetween provide significant resistance to gridwire puncture.

BRIEF DESCRIPTION OF THE DRAWINGS

The invention will be better understood when considered in the light of the following detailed description of a preferred embodiment thereof which is given hereafter in conjunction with the several figures in which.

DESCRIPTION OF A PREFERRED EMBODIMENT

Figure 1:
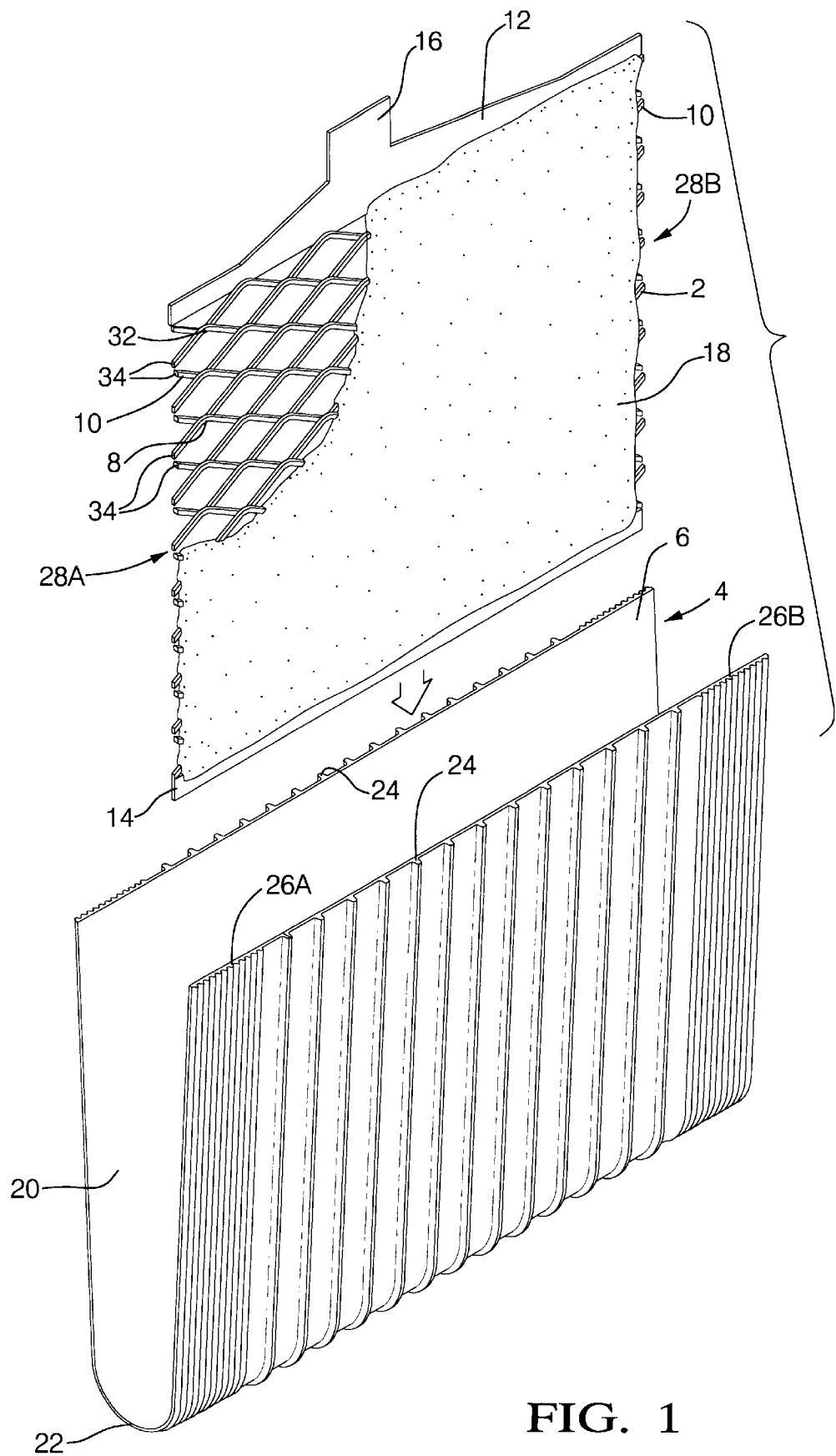
FIG. 1 is a partially broken away isometric view of a battery separator in accordance with the present invention prior to encapsulating a plate.

FIG. 1 illustrates a typical technique for assembling a battery plate 2 in an envelope/sheath 4 of battery separator material 6. The electrode plate 2 comprises an expanded metal grid 8 having a plurality gridwires 10 extending across the face thereof and joined to an electrically conductive border 12 at the top. Optionally, an electrically conductive border 14 may be provided at the bottom of the grid. A lug 16 projects from the top border 12 for coupling to other electrodes of like polarity in a battery element. The grid 8 is covered (e.g., pasted) with an electrochemically active material 18, as is well known in the art. The plate 2 is inserted into the fold 20 of a sheet of separator material 6 which is folded back upon itself along the fold edge 22. The separator 6 includes a plurality of primary ribs 24 which extend across the faces of the separator 6 which overlie the plate 2, and serve to space the enveloped plate 2 from the next adjacent plates in the battery cell element (see FIG. 3). The folded separator 6 includes lateral borders 26A and 26B which overlie, and sandwich therebetween, the lateral edges 28A and 28B of the plate 2, and are bonded to each other outboard the edges 28A and 28B to form the envelope. Such bonding may be effected by heat sealing, ultrasonic welding, pressure welding, etc., as is well known in the art.

Figure 2:
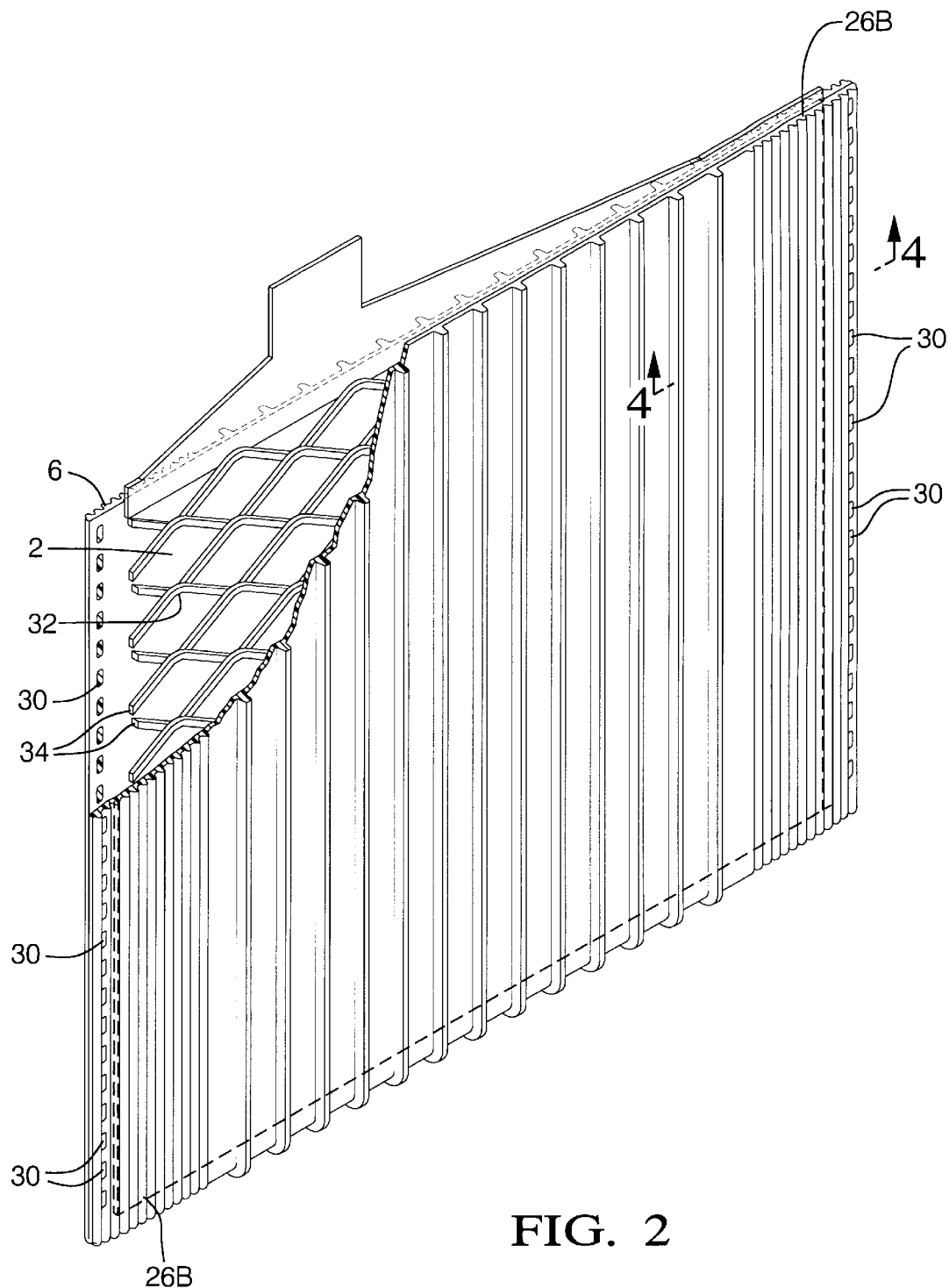
FIG. 2 is a partially broken away isometric view of a battery plate enveloped/sheathed in a battery separator in accordance with the present invention.

FIG. 2 depicts the electrode plate 2 after it has been inserted in, and enveloped by, the microporous separator 6 and pressure bonded to itself at the sites 30 in the borders 26A and 26B. If at the time the plate 2 is cut, the cutters do not cut the plate 2 precisely through nodes 32, but rather through gridwires 10, as shown, the ends 34 of the gridwires 10 can bend up and outwardly of the plane of the plate 2, and possibly puncture the border 26A or 26B of the separator sheath 6, which, in turn, can cause electrical shorting of the adjacent plates. This is a particular problem with prior art separators (see FIG. 5) which have widely spaced (i.e., about 18 ribs per lineal inch) border ribs, and stress concentration sites 48 at the bases of the ribs. Such prior art separators failed primarily at the stress concentration sites.

Figure 3:
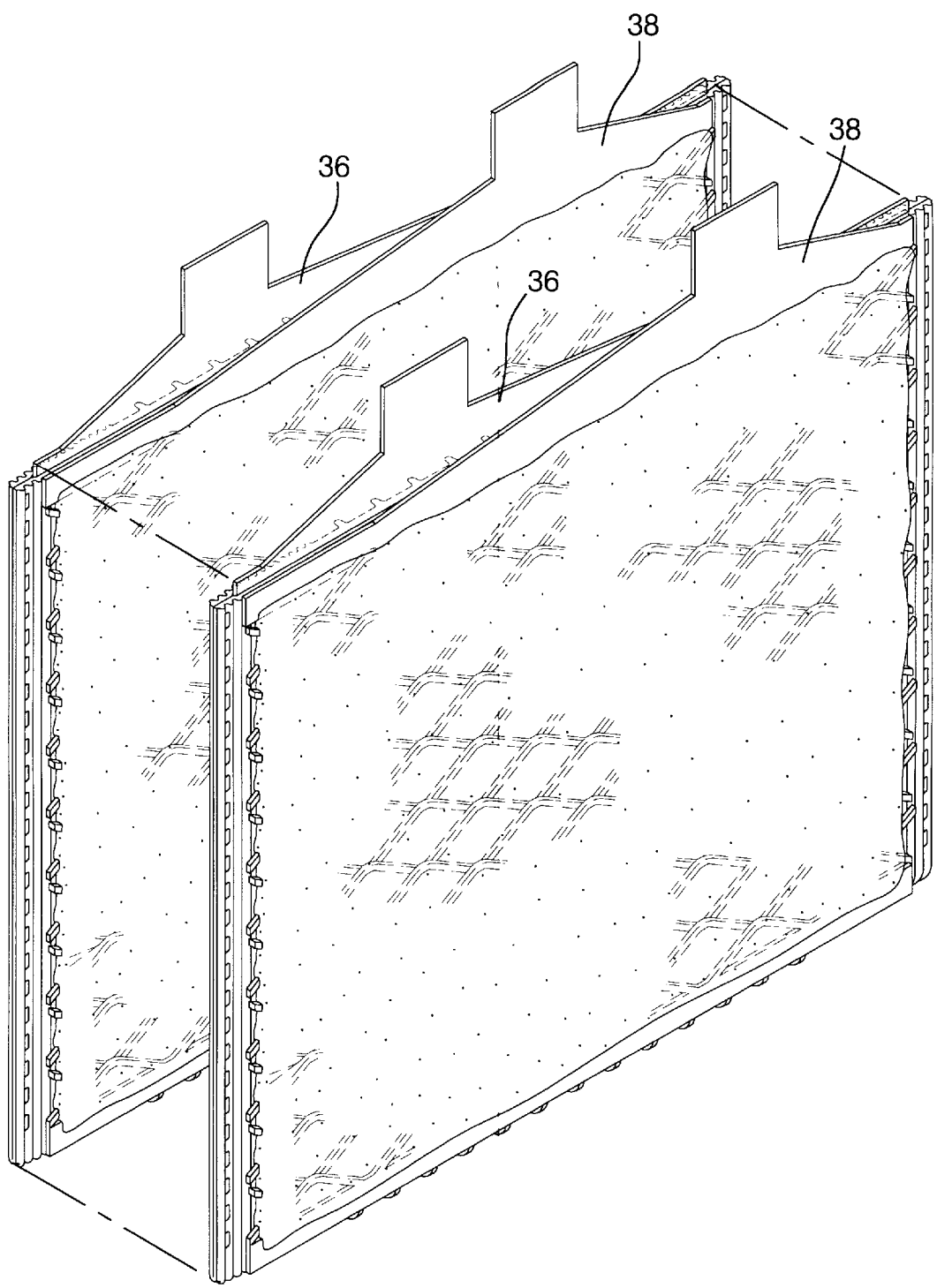
FIG. 3 is an isometric view of a cell element formed from alternating sheathed and unsheathed plates.

FIG. 3 depicts a typical battery cell element comprising a plurality of separator enveloped plates 36 of one polarity alternately interleaved with a plurality of unenveloped plates 38 of the opposite polarity. In some batteries, it may be desirable to envelop the plates of both polarity. Preferably however in the case of lead acid storage batteries, only the negative polarity plates are enveloped in the separator material.

Figure 4:
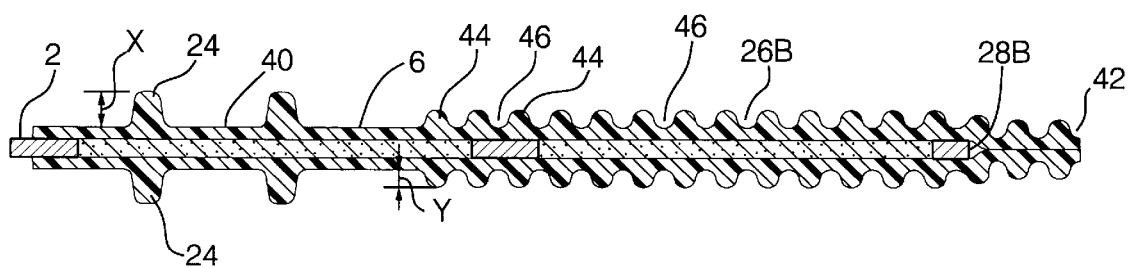
FIG. 4 is a view in the direction 4—4 of FIG. 2.
Figure 5:
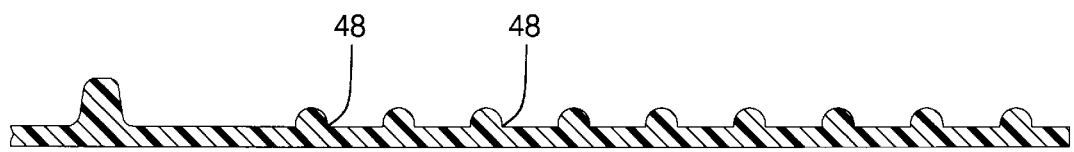
FIG. 5 illustrates the border of a prior art separator used commercially by the assignee of the present invention.

FIG. 4 depicts the electrode plate 2 enveloped in the separator material 6 which has primary plate-spacing ribs 24 having a height X above the face 40, and a border 26B bonded to itself at the edge 42 thereof outboard the edge 28B of the plate 2. The border 26B comprises a plurality of closely spaced secondary, puncture-proofing ribs 44, each separated from the next by elongated concave furrows 46 which provide fillets at the bases of the ribs bordering the furrows and a smooth transition from one rib 44 to the next. Such fillets eliminate any stress concentration sites like those found in prior art separators (see FIG. 5) which are the most common puncture sites for separators now in commercial use by Applicants' assignee. The puncture-proofing ribs 44 have a height Y above the face 40 of the separator, where Y is less than the height X of the plate-spacing ribs 24. By increasing the frequency (i.e., ribs per lineal inch) of the secondary ribs 44, and providing a filleted transition therebetween in the concave furrows 46, the failure rate due to such punctures has been reduced by as much as 24 percent compared to commercial separators as shown in FIG. 5.

Preferably, the exterior surface of the borders 26A and 26B will be corrugated (see FIG. 4) so as to provide a plurality of concave furrows 46 intermediate a plurality of straight, parallel, regularly spaced, and equally curved puncture-proofing ribs 44. Preferably, the border will comprise at least about 29 ribs per lineal inch (i.e., transverse the length of the ribs), and most preferably about 34 ribs per lineal inch. The ribs 44 and furrows 46 will preferably have a radius of about 0.008 inch to about 0.012 inch, and most preferably about 0.010 inch.

While the invention has been disclosed primarily in terms of specific embodiments thereof it is not intended to be limited thereto but rather only to the extent set forth hereafter in the claims which follow.

We claim:

1. In an electric storage battery comprising a plurality of electrode plates each sheathed in an envelope of a microporous polymer sheet of separator material, said plates each comprising an electrochemically active material supported on an expanded metal grid having a plurality of gridwire ends along at least one edge of said plate, and said envelope having at least one border sandwiching said one edge, the improvement comprising said border comprising a plurality of closely spaced ribs, each rib having a top portion and a spaced apart base portion, each rib separated from the next by a concave furrow forming an elongated fillet at the bases of adjacent said ribs.

2. In an electric storage battery comprising a plurality of electrode plates each sheathed in an envelope of a microporous polymer sheet of separator material folded about said plate, said plates each comprising an electrochemically active material supported on an expanded metal grid having a plurality of gridwire ends along at least one edge of said plate, and said envelope having at least one border sandwiching said one edge, the improvement comprising said border having a corrugated exterior surface adapted to reduce the likelihood of said ends puncturing said border wherein said exterior surface is characterized by a plurality of straight, parallel, regularly spaced, and concave furrows intermediate a plurality of straight, parallel, regularly spaced, equally curved ribs.

3. A battery according to claim 2 wherein said border has edges and is bonded to itself at said edges.

4. A battery separator comprising a microporous polymer sheet having a face adapted to confront an electrode plate of said battery, a border along lateral edges of said sheet defining said face, said border comprising a plurality of closely spaced ribs, each rib having a top portion and a spaced apart base portion, each rib separated from the next by a concave furrow at the bases of adjacent said ribs.

5. A battery separator comprising a microporous polymer sheet having a face adapted to confront an electrode plate of said battery, a border along opposing edges of said sheet defining said face, said border having a corrugated surface wherein the face is also characterized by a plurality of straight, parallel, regularly spaced, and concave furrows intermediate a plurality of straight, parallel, regularly spaced, equally curved ribs.

* * * * *